US012286008B2

(12) United States Patent
Chandler (10) Patent No.: US 12,286,008 B2
(45) Date of Patent: Apr. 29, 2025

(54) ACTIVE VANE CONTROL SYSTEM AND METHOD

(71) Applicant: JAGUAR LAND ROVER LIMITED, Coventry (GB)

(72) Inventor: Paul Chandler, Warwick (GB)

(73) Assignee: Jaguar Land Rover Limited, Warwickshire (GB)

( * ) Notice: Subject to any disclaimer, the term of this patent is extended or adjusted under 35 U.S.C. 154(b) by 444 days.

(21) Appl. No.: 17/626,745

(22) PCT Filed: Jul. 10, 2020

(86) PCT No.: PCT/EP2020/069570
§ 371 (c)(1),
(2) Date: Jan. 12, 2022

(87) PCT Pub. No.: WO2021/009051
PCT Pub. Date: Jan. 21, 2021

(65) Prior Publication Data
US 2022/0250464 A1 Aug. 11, 2022

(30) Foreign Application Priority Data
Jul. 12, 2019 (GB) .................................... 1910002

(51) Int. Cl.
*B60K 11/08* (2006.01)
*B60K 1/04* (2019.01)
(Continued)

(52) U.S. Cl.
CPC .............. *B60K 11/085* (2013.01); *B60K 1/04* (2013.01); *F02G 5/02* (2013.01); *B60K 2001/005* (2013.01); *B60K 2001/006* (2013.01)

(58) Field of Classification Search
CPC ..... F02G 5/02; F01P 7/10; B60K 1/04; B60K 11/085; B60K 2001/005; B60K 2001/006; Y02T 10/12
See application file for complete search history.

(56) References Cited

U.S. PATENT DOCUMENTS

2007/0227144 A1* 10/2007 Yaguchi .................... F02G 5/02
60/618
2017/0082092 A1 3/2017 Gaither
(Continued)

FOREIGN PATENT DOCUMENTS

EP 3363674 A1 8/2018
JP 2014201278 A * 10/2014
(Continued)

OTHER PUBLICATIONS

Machine translation of description of JP-2014201278-A, pp. 1-7 (Year: 2014).*
(Continued)

*Primary Examiner* — Anne Marie Antonucci
*Assistant Examiner* — Jared C Bean
(74) *Attorney, Agent, or Firm* — Reising Ethington P.C.

(57) ABSTRACT

Aspects of the present invention relate to a method of controlling one or more active vanes (2-$n$) on a host vehicle (VH1) having an energy recovery system (10). The one or more active vanes (2-$n$) is selectively configurable in a first position and a second position. The method comprises, in respect of one or more current operating parameters of the host vehicle (VH1), determining a first energy expended value (EEV1) and a first energy recovery value (ERV1) associated with the one or more active vanes (2-$n$) in the first position. A second energy expended value (EEV2) and a second energy recovery value (ERV2) associated with the one or more active vanes (2-$n$) are determined in respect of the second position. A first difference (D1) is determined
(Continued)

between the first energy expended value (EEV1) and the first energy recovery value (ERV1). A second difference (D2) between the second energy expended value (EEV2) is determined and the second energy recovery value (ERV2). The one or more active vanes (2-$n$) is configured in the first position when the magnitude of the first difference (D1) is greater than the magnitude of the second difference (D2). The one or more active vanes (2-$n$) is configured configuring the one or more active vanes (2-$n$) in the second position when the magnitude of the second difference (D2) is greater than the magnitude of the first difference (D1). Aspects of the present invention also relate to a control system (1); a host vehicle (VH1); computer software; and a non-transitory, computer-readable storage medium.

19 Claims, 5 Drawing Sheets

(51) Int. Cl.
*F02G 5/02* (2006.01)
*B60K 1/00* (2006.01)

(56) References Cited

U.S. PATENT DOCUMENTS

| | | |
|---|---|---|
| 2018/0209324 A1 | 7/2018 | Schwartz et al. |
| 2018/0312039 A1 | 11/2018 | Sakane et al. |
| 2018/0361846 A1* | 12/2018 | Dudar .................. B60K 11/085 |
| 2019/0126904 A1 | 5/2019 | Son et al. |

FOREIGN PATENT DOCUMENTS

| | | | |
|---|---|---|---|
| WO | 2008129190 A1 | 10/2008 | |
| WO | 2017077811 A1 | 5/2017 | |
| WO | WO-2018043753 A1 * | 3/2018 | .......... B60W 30/165 |

OTHER PUBLICATIONS

Machine translation of description of WO-2018043753-A1, pp. 1-9 (Year: 2018).*
International Search Report corresponding to International Application No. PCT/EP2020/069570, dated Sep. 1, 2020, 4 pages.
Written Opinion corresponding to International Application No. PCT/EP2020/069570, dated Sep. 1, 2020, 8 pages.
Great Britain Search Report corresponding to GB Application No. GB1910002.3, dated Jan. 7, 2020, 4 pages.

* cited by examiner

ACTIVE VANE CONTROL SYSTEM AND METHOD

TECHNICAL FIELD

The present disclosure relates to an active vane control system and method. Aspects of the invention relate to a method of controlling one or more active vanes; a control system for controlling one or more active vanes; a vehicle; computer software; and a non-transitory, computer-readable storage medium.

BACKGROUND

It is known to provide one or more active vanes on a vehicle to controllably open and close one or more apertures for supplying cooling airflow. The active vanes may, for example, be provided in a grille of the vehicle to control the supply of cooling airflow to a radiator to perform cooling of an internal combustion engine. The one or more active vanes may be closed to prevent airflow through the aperture to improve airflow around the vehicle, thereby reducing aerodynamic drag. A typical control strategy may, for example, comprise closing the one or more active vanes when at a predefined speed threshold. This control strategy is intended to reduce aerodynamic drag at higher speeds.

It is an aim of the present invention to address one or more of the disadvantages associated with the prior art.

SUMMARY OF THE INVENTION

Aspects and embodiments of the invention provide a method of controlling one or more active vanes; a control system for controlling one or more active vanes; a vehicle; computer software; and a non-transitory, computer-readable storage medium as claimed in the appended claims According to a further aspect of the present invention there is provided a method of controlling one or more active vanes on a host vehicle having an energy recovery system, the one or more active vanes being selectively configurable in a first position and a second position. The method may comprise, in respect of one or more current operating parameters of the host vehicle, determining a first energy expended value and a first energy recovery value associated with the one or more active vanes in the first position; and a second energy expended value and a second energy recovery value associated with the one or more active vanes in the second position. The method may comprise determining a first difference between the first energy expended value and the first energy recovery value; and a second difference between the second energy expended value and the second energy recovery value. The method may comprise configuring the one or more active vanes in the first position when the magnitude of the first difference is greater than the magnitude of the second difference. The method may comprise configuring the one or more active vanes in the second position when the magnitude of the second difference is greater than the magnitude of the first difference.

The first and second energy expended values may represent a cost (penalty) associated with having the one or more active vanes in the first position or the second position. The energy recovery value may represent a benefit associated with having the one or more active vanes in the first position or the second position.

By comparing the first and second differences, the control system may identify opportunities to configure the one or more active vanes to improve energy recovery. The method comprises configuring the one or more active vanes to improve energy recovery when it is determined that these gains would outweigh other energy losses, such as losses associated with an increase in aerodynamic drag. If the energy savings associated with closing the active vanes (to reduce aerodynamic drag) are less than the energy that can be recovered by operating an energy recovery system with the active vanes open, the method comprises opening the one or more active vanes (or maintaining the one or more active vanes open). If the energy savings associated with closing the active vanes (to reduce aerodynamic drag) are greater than the energy that can be recovered by operating an energy recovery system with the active vanes open, the method comprises closing the active vanes (or maintaining the one or more active vanes closed).

The one or more active vanes may be actuated to control airflow for cooling. The one or more active vanes may be configured to increase heat rejection by the energy recovery system. In particular, the one or more active vanes may be configured in an open position to increase airflow for cooling. The increased heat rejection may extend the operational range of the energy recovery system. At least in certain embodiments, this may result in increased energy recovery by the energy recovery system. However, configuring the one or more active vanes in the open position may result in an increase in the aerodynamic drag of the vehicle. At least in certain embodiments, the method(s) described herein may enable the one or more active vanes to be configured in the open position or the closed position appropriate to improve overall efficiency.

The first and second energy recovery values may be indicative of energy recoverable by the energy recovery system. The first and second energy recovery values may be dimensionless.

The energy recovery system may be configured to recover thermal energy from an exhaust system of the host vehicle. The first and second energy recovery values may be determined in dependence on one or more of the following: a temperature of the exhaust system; and a reference speed of the host vehicle.

The method may comprise detecting at least one target vehicle. The first and second energy recovery values may be determined in dependence on one or more of the following: a proximity to and/or a position of the at least one target vehicle; a size and/or a profile of the at least one target vehicle; and an ordinal position of the host vehicle in a platoon comprising the at least one target vehicle. The size and profile of the at least one target vehicle may be taken into account to assess ambient airflow conditions, for example to model the longitudinal and/or lateral extent of the wake generated by a leading target vehicle. By determining if the host vehicle is within the wake, the available airflow for cooling can be estimated.

The first and second energy expended values may be indicative of energy expenditure associated with aerodynamic drag on the host vehicle. The first and second energy expended values may be determined in dependence on a reference speed of the host vehicle.

The method may comprise detecting at least one target vehicle. The method may comprise determining a size and/or a profile of the at least one target vehicle. The first and second energy expended values may be determined in dependence on one or more of the following: a proximity to and/or a position of at least one target vehicle; and a size and/or a profile of at least one target vehicle. The size and profile of the at least one target vehicle may be taken into account to assess ambient airflow conditions, for example to model the longitudinal and/or lateral extent of the wake generated by a leading target vehicle. By determining if the host vehicle is within the wake, the aerodynamic drag experienced by the host vehicle can be modelled.

The at least one target vehicle may be in front of the host vehicle. Alternatively, or in addition, the at least one target vehicle may be behind the host vehicle.

The one or more active vanes may be closed or partially closed in the first position. The one or more active vanes may be open or partially open in the second position.

The one or more active vanes may comprise a first active vane and a second active vane. The method may comprise controlling the first and second active vanes independently of each other. The first active vane may be associated with a first of the one or more vehicle systems. The second active vane may be associated with a second of the one or more vehicle systems.

The method may comprise determining the first and second energy expended values and the first and second energy recovery values to reflect current (i.e. instantaneous) operating conditions of the vehicle. Alternatively, or in addition, the method may comprise predicting the first and second energy expended values and the first and second energy recovery values, for example to represent future operating conditions of the vehicle. The prediction may, for example, be performed in respect of a rolling time period. The method may, for example, comprise using route information and/or map data to predict the operating conditions. The method may comprise controlling the one or more active vanes to pre-condition one or more vehicle systems in dependence on the predicted value(s). By way of example, the method may comprise controlling the one or more active vanes to pre-condition a battery, such as a traction battery. The one or more active vanes may be opened to supply airflow to the battery to perform cooling prior to a charging event. This may be performed while the host vehicle is travelling behind another vehicle and/or is travelling in a platoon when the impact on vehicle drag may be reduced (compared to when the host vehicle is in a lead position). Opening the one or more active vanes may increase energy recovered by the energy recover system (which may comprise one or more heat pumps). These control strategies may help to reduce or minimise impact on range of a vehicle, such as a battery electric vehicle.

According to a further aspect of the present invention there is provided a control system for controlling one or more active vanes on a host vehicle having an energy recovery system, the control system comprising one or more controllers. The control system may be configured to: determine a first energy expended value and a first energy recovery value associated with the one or more active vanes in the first position; and determine a second energy expended value and a second energy recovery value associated with the one or more active vanes in the second position. The control system may be configured to determine a first difference between the first energy expended value and the first energy recovery value; and to determine a second difference between the second energy expended value and the second energy recovery value. The control system may be configured to configure the one or more active vanes in the first position when the magnitude of the first difference is greater than the magnitude of the second difference; and to configure the one or more active vanes in the second position when the magnitude of the second difference is greater than the magnitude of the first difference.

The one or more controllers may collectively comprise at least one electronic processor having an electrical input for receiving a vehicle speed signal comprising a reference speed of the host vehicle; and at least one memory device electrically coupled to the at least one electronic processor and having instructions stored therein. The at least one electronic processor may be configured to access the at least one memory device and execute the instructions thereon so as to determine the first and second energy expended values in dependence on the reference speed of the host vehicle.

The control system may be configured to detect at least one target vehicle. The first and second energy recovery values may be determined in dependence on one or more of the following: a proximity to and/or a position of the at least one target vehicle; and a size and/or a profile of the at least one target vehicle.

The energy recovery system may be configured to recover thermal energy from an exhaust system of the host vehicle. The first and second energy recovery values may be determined in dependence on one or more of the following: a temperature of the exhaust system; and a reference speed of the host vehicle.

The first and second energy recovery values may be indicative of energy recoverable by the energy recovery system.

The first and second energy expended values may be indicative of energy expenditure associated with aerodynamic drag on the host vehicle.

The control system may be configured to detect at least one target vehicle. The first and second energy expended values may be determined in dependence on one or more of the following: a proximity to and/or a position of at least one target vehicle; a size and/or a profile of at least one target vehicle; and an ordinal position of the host vehicle in a platoon comprising the at least one target vehicle.

The one or more active vanes may be closed in the first position. The one or more active vanes may be open in the second position.

The one or more active vanes may comprise a first active vane and a second active vane. The control system may be configured to control the first and second active vanes independently of each other.

The or each active vane may be associated with one or more apertures. The one or more apertures may, for example, be disposed in a grille. The one or more apertures may be partially or fully closed when the associated active vane(s) is in the closed position. The one or more apertures may be partially or fully open when the associated active vane(s) is in the open position. Airflow through the one or more apertures may be permitted when the associated vane(s) is in the open position. The or each active vane may comprise or consist of a shutter, such as a grille shutter.

The control system may be configured to predict the first and second energy expended values and the first and second energy recovery values. The predicted first and second energy expended values and the first and second energy recovery values, may represent future operating conditions of the vehicle. The prediction may, for example, be performed in respect of a rolling time period. The control system may utilise route information and/or map data to predict the operating conditions. The control system may be configured to control the one or more active vanes in dependence on the predicted value(s). At least in certain embodiments, the control system may pre-condition one or more vehicle systems in dependence on the predicted value(s). By way of example, the method may comprise controlling the one or more active vanes to pre-condition a battery, such as a traction battery. The one or more active vanes may be opened to supply airflow to the battery to perform cooling prior to a charging event. This may be performed while the host vehicle is travelling behind another vehicle and/or is travelling in a platoon when the impact on vehicle drag may be reduced (compared to when the host vehicle is in a lead position). Opening the one or more active vanes may increase energy recovered by the energy recover system (which may comprise one or more heat pumps). These control strategies may help to reduce or minimise impact on range of a vehicle, such as a battery electric vehicle.

According to a further aspect of the present invention there is provided a vehicle comprising the control system as described herein.

According to a still further aspect of the present invention there is provided a computer software that, when executed, is arranged to perform a method as described herein.

According to a further aspect of the present invention there is provided a non-transitory, computer-readable storage medium storing instructions thereon that, when executed by one or more electronic processors, causes the one or more electronic processors to carry out the method(s) described herein.

Within the scope of this application it is expressly intended that the various aspects, embodiments, examples and alternatives set out in the preceding paragraphs, in the claims and/or in the following description and drawings, and in particular the individual features thereof, may be taken independently or in any combination. That is, all embodiments and/or features of any embodiment can be combined in any way and/or combination, unless such features are incompatible. The applicant reserves the right to change any originally filed claim or file any new claim accordingly, including the right to amend any originally filed claim to depend from and/or incorporate any feature of any other claim although not originally claimed in that manner.

BRIEF DESCRIPTION OF THE DRAWINGS

One or more embodiments of the invention will now be described, by way of example only, with reference to the accompanying drawings, in which.

DETAILED DESCRIPTION

A control system 1 for a host vehicle VH1 in accordance with an embodiment of the present invention is described herein with reference to the accompanying Figures. As described herein, the control system 1 is configured to control the opening and closing of one or more active vanes 2-n provided on the host vehicle VH1. The control system 1 is configured to control operation of the active vanes 2-n to control cooling of one or more vehicle systems. The host vehicle VH1 is an automobile in the present embodiment. It will be understood that other types of host vehicle VH1 are also contemplated. For example, the host vehicle VH1 may be a truck or a tractor unit.

The host vehicle VH1 comprises a hybrid drivetrain having an internal combustion engine 4 and one or more electric traction motors 5. The internal combustion engine 4 may be a diesel engine or a gasoline engine. The internal combustion engine 4 and the one or more electric traction motors 5 are operable to propel the host vehicle VH1. The internal combustion engine 4 and the one or more electric traction motors 5 may operate in parallel to propel the host vehicle VH1 or may operate independently of each other, for example to enable the host vehicle VH1 to be propelled by only the one or more electric traction motors 5. The internal combustion engine 4 is connected to an exhaust system 6 for exhausting combustion gases to atmosphere. The exhaust system 6 comprises exhaust gas treatment systems (not shown), such as a particulate filter and/or a catalytic converter. A heat exchanger 7 comprising a radiator is provided for cooling the internal combustion engine 4. The host vehicle VH1 comprises a traction battery 8 for powering the one or more electric traction motors 5. An inverter 9 is provided for powering the one or more electric traction motors 5. In a variant, the internal combustion engine 4 may be a range-extender engine which is operable to charge the traction battery 8. In a range-extender configuration, the internal combustion engine 4 may not be operable to drive the host vehicle VH1. It will be understood that the control system 1 may be applied to a host vehicle VH1 which does not include an electric traction motor 5. The host vehicle VH1 may, for example, rely exclusively on an internal combustion engine 4 as propulsion means.

An energy recovery system 10 is provided for recovering energy. The energy recovery system 10 in the present embodiment comprises a thermal energy recovery system for recovering thermal energy from the exhaust system 6. The exhaust energy recovery system is operable to convert the thermal energy to another form of energy that can be used by the host vehicle VH1. The exhaust energy recovery system in the present embodiment is a Rankine cycle system configured to vaporize pressurised water. The energy recovery system 10 comprises a steam generator 11 located in an exhaust conduit 12 of the exhaust system 6. The resulting steam drives an expander (comprising a turbine or a piston) which drives an alternator 13 to generate electricity. The electricity generated by the alternator 13 can be supplied to one or more electrical systems on the host vehicle VH1 and/or can be stored in an energy storage device, such as an on-board battery or capacitor. The electrical energy could be used to charge the traction battery 8. In a variant, the exhaust energy recovery system can be configured to convert the thermal energy to mechanical energy which may be used to propel the host vehicle VH1, for example by introducing the mechanical energy at the crankshaft (not shown). Other types of exhaust energy recovery system are also contemplated. The exhaust energy recovery system may, for example, comprise a thermoelectric generator, organic Rankine/steam cycles, inverted Brayton-type systems. The exhaust energy recovery system may use the recovered thermal energy to promote heating of the internal combustion engine 4, the traction battery 8, or a transmission (not shown), for example to achieve a target operating temperature.

Figure 1:
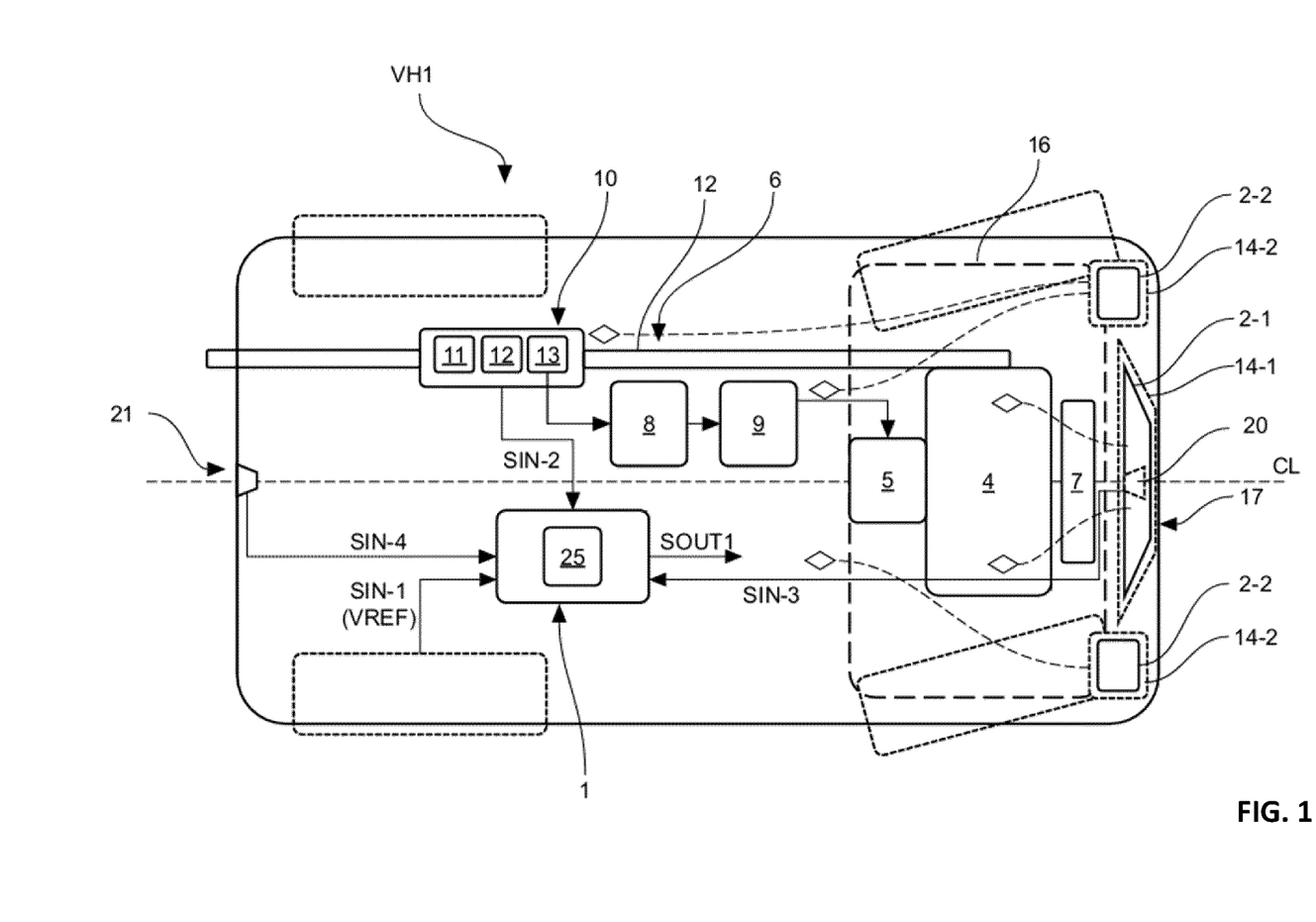
FIG. 1 shows a schematic representation of a host vehicle comprising a control system for controlling operation of first and second active vanes in accordance with an embodiment of the present invention.
Figure 2:
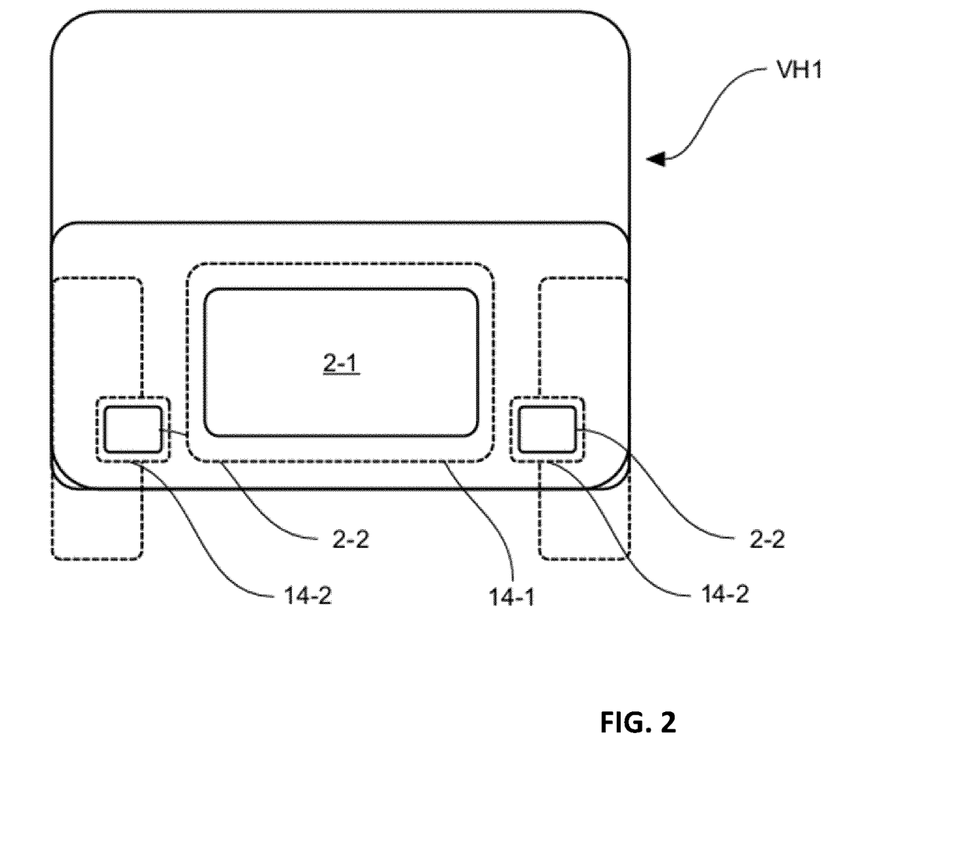
FIG. 2 shows a front elevation of the host vehicle shown in FIG. 1.

As outlined above, the host vehicle VH1 comprises one or more active vanes 2-n. Each active vane 2-n is associated with an aperture 14-*n*. One or more actuator (not shown) is provided to actuate the one or more active vanes 2-*n*. The one or more actuator may, for example, comprise an electromechanical actuator. The one or more active vanes 2-*n* are movable between a closed position in which the associated aperture 14-*n* is partially or completely closed; and at least one open position in which the associated aperture 14-*n* is partially or completely open. By actively controlling each of the one or more active vanes 2-*n*, the airflow through the associated aperture 14-*n* can be controlled. The airflow through each aperture 14-*n* is reduced or inhibited when the associated active vane 2-*n* is in the closed position. Conversely, the airflow through each aperture 14-*n* is increased when the associated active vane 2-*n* is in the open position. The apertures 14-*n* are typically associated with the one or more vehicle systems. By configuring the active vane(s) 2-*n* in the open position, the airflow through the aperture(s) 14-*n* may be increased to promote cooling of the one or more vehicle systems. The airflow through the aperture(s) 14-*n* may be controlled by adjusting the extent to which the active vane(s) 2-*n* are open. By configuring the active vane(s) 2-*n* in the closed position, the airflow through the aperture(s) 14-*n* is reduced or inhibited to reduce aerodynamic drag of the host vehicle VH1 (i.e. lower the Coefficient of drag Cd) and improve aerodynamic efficiency. The airflow through the apertures 14-*n* is illustrated in FIG. 1 by dashed lines having a diamond head.

The control system 1 is configured to control the active vane(s) 2-*n* to control the supply of airflow for cooling to one or more vehicle systems on the host vehicle VH1. The heat exchanger 7 is a first of the one or more vehicle systems. As shown in FIG. 1, the heat exchanger 7 is mounted centrally in an engine compartment 16 at the front of the host vehicle VH1. A grille 17 is provided in front of the heat exchanger 7. The aperture(s) 14-*n* in this arrangement comprise grille apertures 14-1 formed in the grille 17. The plurality of active vanes 2-*n* comprises at least one first active vane 2-1 associated with the grille 17. In the present embodiment, a plurality of the first active vanes 2-1 are each associated with a respective grille aperture 14-1. The first active vanes 2-1 are operable actively to control airflow for cooling from outside the host vehicle VH1 through the grille aperture 14-1. The first active vanes 2-1 are disposed in an open position to enable airflow through the grille apertures 14-1 and over the heat exchanger 7. The first active vanes 2-1 are disposed in a closed position to inhibit airflow into the engine compartment 16, thereby controlling the airflow around the exterior of the host vehicle VH1 to reduce aerodynamic drag.

The aperture(s) 14-*n* comprise outboard apertures 14-2 formed in the front bumper 18. Airflow through the outboard apertures 14-2 may be suitable for cooling vehicle systems other than the heat exchanger 7. For example, the airflow may perform cooling of the one or more of the following: the electric traction motor(s) 5, the traction battery 8 and the inverter 9. The plurality of active vanes 2-*n* comprise at least one second active vane 2-2 for controlling the supply of airflow for cooling through the outboard apertures 14-2. The second active vanes 2-2 are disposed in outboard positions at the front of the host vehicle VH1. In the present embodiment, the second active vanes 2-2 are disposed in a front bumper 18 of the host vehicle VH1. The second active vanes 2-2 are operable actively to control the airflow through the outboard apertures 14-3. The second active vanes 2-2 are disposed in an open position to enable airflow through the outboard apertures 14-2. The second active vanes 2-2 are disposed in a closed position to inhibit airflow through the outboard apertures 14-2, thereby controlling the airflow around the host vehicle VH1 to reduce aerodynamic drag.

The airflow introduced through the apertures 14-*n* for cooling can increase heat rejection by the energy recovery system. The increased heat rejection can extend the operating window of the energy recovery system, thereby potentially increasing the effectiveness of the energy recovery system in recovering thermal energy from the exhaust system 6. At least in certain embodiments, the energy recovery system may recover more energy from the exhaust system 6 when the active vanes 2-*n* are in an open position than when the active vanes 2-*n* are in a closed position. It has been recognised, however, that the aerodynamic drag of the host vehicle VH1 may be higher when the active vanes 2-*n* are in an open position than when the active vanes 2-*n* are in a closed position. As a result of the increased aerodynamic drag, the energy expended to propel the host vehicle VH1 (assuming constant operating conditions) will be higher. As described herein, the control system 1 is configured to take account of the changes in the recovered energy and the expended energy associated with the relative position of the active vanes 2-*n*.

Figure 3:
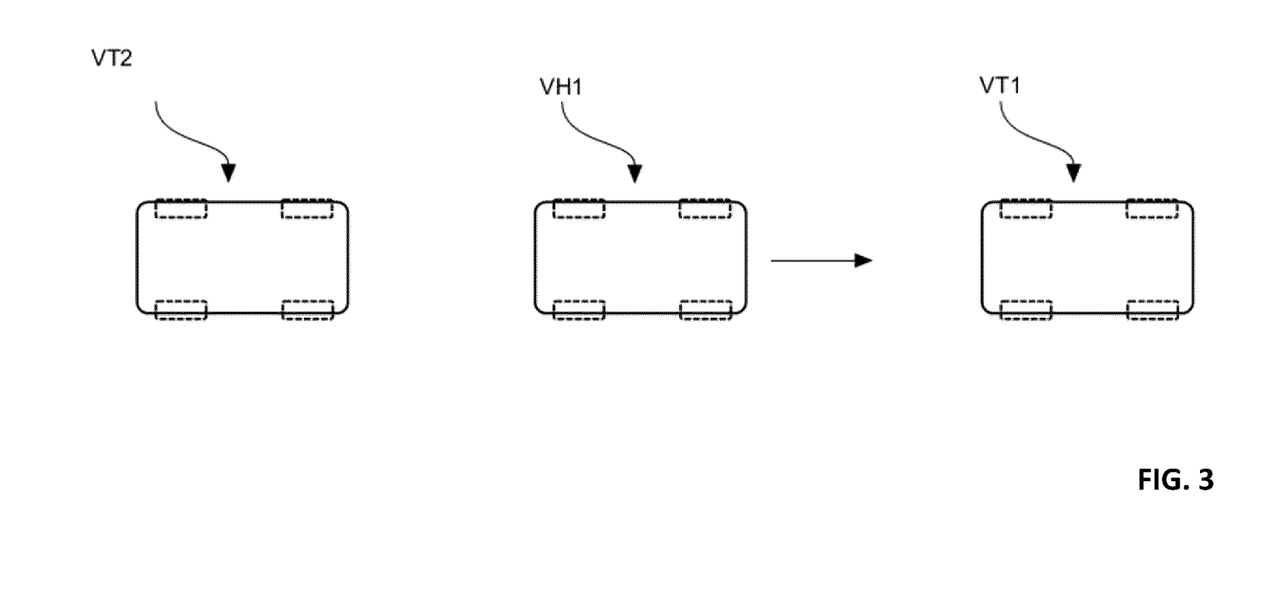
FIG. 3 shows a schematic representation of the host vehicle in a platoon comprising a plurality of target vehicles.

The host vehicle VH1 comprises one or more sensors for detecting a target vehicle VTn. As illustrated in FIG. 3, the target vehicle may be in front of the host vehicle VH1 (referred to herein as a "lead target vehicle VT1") or may be behind the host vehicle VH1 (referred to herein as a "trailing target vehicle VT2"). As shown in FIG. 1, the host vehicle VH1 comprises one or more front sensors 20 for detecting the lead target vehicle VT1. The front sensor(s) 20 is operable to measure a distance between the host vehicle VH1 and the lead target vehicle VT1; and to determine a position of the lead target vehicle VT1 relative to the host vehicle VH1. The front sensor(s) 20 in the present embodiment is also operable to determine a size and/or a profile of the lead target vehicle VT1. The front sensor(s) 20 can be used to determine a cross-sectional area of the lead target vehicle VT1. As shown in FIG. 1, the host vehicle VH1 comprises one or more rear sensor 21 for detecting the trailing target vehicle VT2. The rear sensor(s) 21 is operable to measure a distance between the host vehicle VH1 and the trailing target vehicle VT2; and to determine a position of the trailing target vehicle VT2 relative to the host vehicle VH1. The rear sensor(s) 21 in the present embodiment is also operable to determine a size and/or a profile of the trailing target vehicle VT2. The rear sensor(s) 21 can be used to determine a cross-sectional area of the trailing target vehicle VT2. The front and rear sensors 20, 21 in the present embodiment comprise front and rear radar systems. Other types of sensors are contemplated. For example, the front sensor(s) 20 and/or the rear sensor(s) 21 may comprise a Lidar sensor. In a variant, the relative position of a lead target vehicle VT1 and/or a trailing target vehicle VT2 may be determined via vehicle-to-vehicle (V2V) communication, or vehicle-to-infrastructure (V2X) communication. By way of example, vehicle-to-vehicle communication may be implemented when vehicles are travelling in a platoon (road-train). The vehicle-to-vehicle communication may, for example, indicate an ordinal position of the host vehicle VH1 within the platoon. For example, vehicle-to-vehicle communication may enable determination of whether the host vehicle VH1 is the first, second, third, fourth (and so on) vehicle within the platoon.

The control system 1 comprises one or more controllers 25. It is to be understood that the or each controller 25 can comprise a control unit or computational device having one or more electronic processors (e.g., a microprocessor, a microcontroller, an application specific integrated circuit (ASIC), etc.), and may comprise a single control unit or computational device, or alternatively different functions of the or each controller 25 may be embodied in, or hosted in, different control units or computational devices. As used herein, the term "controller," "control unit," or "computational device" will be understood to include a single controller, control unit, or computational device, and a plurality of controllers, control units, or computational devices collectively operating to provide the required control functionality. A set of instructions could be provided which, when executed, cause the controller 25 to implement the control techniques described herein (including some or all of the functionality required for the method described herein). The set of instructions could be embedded in said one or more electronic processors of the controller 25; or alternatively, the set of instructions could be provided as software to be executed in the controller 25. A first controller or control unit may be implemented in software run on one or more processors. One or more other controllers or control units may be implemented in software run on one or more processors, optionally the same one or more processors as the first controller or control unit. Other arrangements are also useful.

Figure 4:
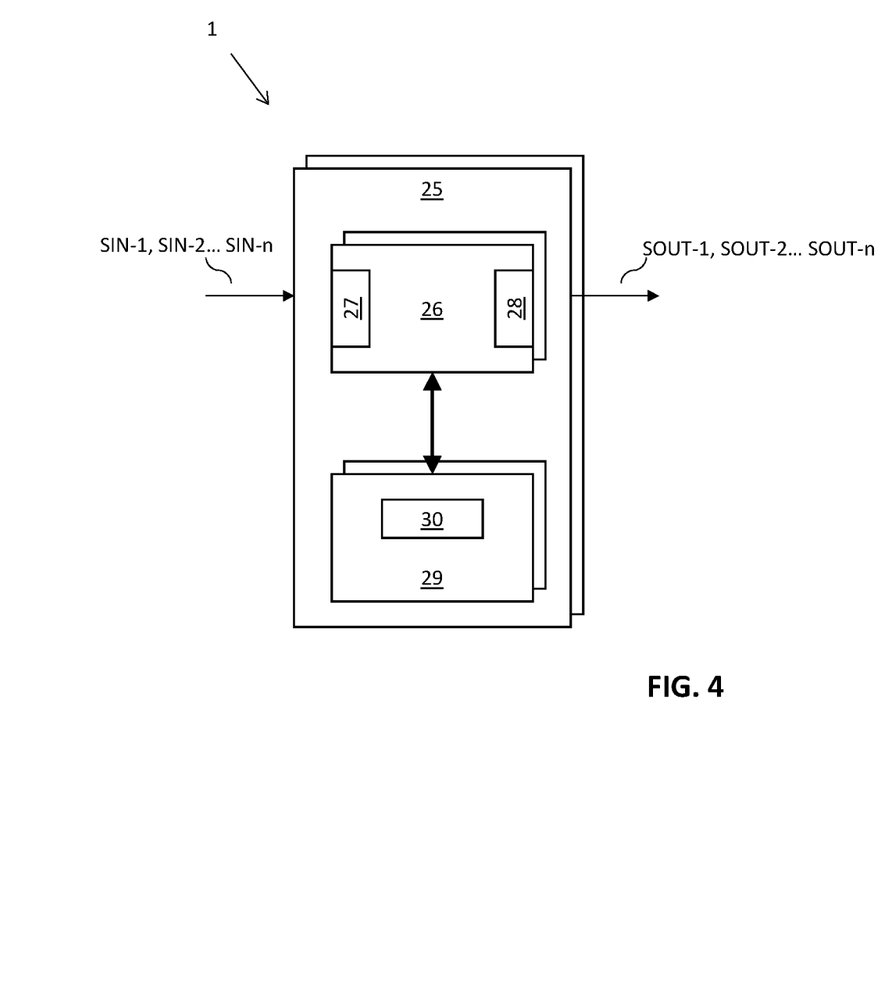
FIG. 4 shows a schematic representation of the control system in accordance with an embodiment of the present invention.

In the example illustrated in FIG. 4, the or each controller 25 comprises at least one electronic processor 26 having one or more electrical input(s) 27 for receiving one or more input signals SIN-n, and one or more electrical output(s) 28 for outputting one or more output signals SOUT-n. The or each controller 25 further comprises at least one memory device 29 electrically coupled to the at least one electronic processor 26 and having instructions 30 stored therein. The at least one electronic processor 26 is configured to access the at least one memory device 29 and execute the instructions 30 thereon so as to perform the method(s) described herein.

The input signals SIN-n comprise a reference speed signal SIN-1 which indicates a reference speed VREF of the host vehicle VH1. The reference speed may, for example, be determined in dependence on speed signals received from one or more wheel speed sensors (not shown). Alternatively, or in addition, the reference speed VREF may be determined in dependence on a navigation system, such as Global Positioning System (GPS). The input signals SIN-n comprise a temperature signal SIN-2 which indicates a temperature of the exhaust system 6, for example an exhaust gas temperature. The temperature may be measured by one or more temperature sensors or may be modelled in dependence on operating conditions of the internal combustion engine 4.

The input signal(s) SIN-n comprises a front sensor(s) signal SIN-3 from the front sensor(s) 20. The front sensor(s) signal SIN-3 indicates the presence or absence of a lead target vehicle VT1. If a lead target vehicle VT1 is detected, the front sensor(s) signal SIN-3 also indicates a relative position of the lead target vehicle VT1 and a distance between the host vehicle VH1 to the lead target vehicle VT1. The relative position of the lead target vehicle VT1 may, for example, be defined in relation to a longitudinal axis of the host vehicle VH1. In the present embodiment, the front sensor(s) signal SIN-3 includes an estimated cross-sectional area of the lead target vehicle VT1.

The input signal(s) SIN-n comprises a rear sensor(s) signal SIN-4 from the rear sensor(s) 21. The rear sensor(s) signal SIN-4 indicates the presence or absence of a trailing target vehicle VT2. If a trailing target vehicle VT2 is detected, the rear sensor(s) signal SIN-4 also indicates a relative position of the trailing target vehicle VT2 and a determined distance from the host vehicle VH1 to the trailing target vehicle VT2. The relative position of the trailing target vehicle VT2 may, for example, be defined in relation to a longitudinal axis of the host vehicle VH1. In the present embodiment, the rear sensor(s) signal SIN-3 includes an estimated cross-sectional area of the trailing target vehicle VT2.

The output signal SOUT-1 comprises one or more vane control signal for controlling operation of the active vane(s) 2-n. In the present embodiment, the output signal SOUT-1 comprises a first vane control signal for controlling operation of the first active vanes 2-1 and a second vane control signal for controlling operation of the second active vanes 2-2. The first and second vane control signals control operation of the actuators associated with the first and second active vanes 2-1, 2-2. In particular, the actuators are configured to displace the first and second active vanes 2-1, 2-2 to the respective open or closed positions in dependence on the first and second vane control signals. The operation of the control system 1 to generate the output signal SOUT-1 will now be described.

With reference to FIG. 4, there is illustrated a simplified example of a control system 1 such as may be adapted to implement the method described herein. The control system 1 comprises one or more controllers 24 and is configured to determine vehicle operating parameters for different configurations of the active vanes 2-2. In particular, the controller(s) 24 determines vehicle operating parameters when the active vanes 2-n are in at least first and second positions. The control system 1 is configured to control one or more of the active vanes 2-n in dependence on the determined vehicle operating parameters. In the arrangement described herein, the first configuration corresponds to a closed position; and the second configuration corresponds to an open position.

The controller 25 determines a first energy expended value EEV1 and a first energy recovery value ERV1 associated with the one or more active vanes 2-n in the first position. A first difference D1 is determined between the first energy expended value EEV1 and the first energy recovery value ERV1. The first difference D1 provides an indication of a differential between the energy expended and the energy recovery when the active vanes 2-n are in the first position. The controller 25 determines a second energy expended value EEV2 and a second energy recovery value ERV2 associated with the one or more active vanes in the second position. A second difference D2 is determined between the second energy expended value EEV2 and the second energy recovery value ERV2. The second difference D2 provides an indication of a differential between the energy expended and the energy recovery when the active vanes 2-n are in the second position. The controller 25 is configured to compare the first and second differences D1, D2 and to configure the active vanes 2-n in dependence on the comparison. The controller 25 configures the active vanes 2-n in the first position when the magnitude of the first difference D1 is greater than the magnitude of the second difference D2. Conversely, the controller 25 configures the active vanes 2-n in the second position when the magnitude of the second difference D2 is greater than the magnitude of the first difference D1. The control system 1 thereby assesses whether the operating efficiency of the host vehicle VH1 is improved when the active vanes 2-n are in the first position or the second position. It will be understood that this assessment may be performed in respect of more than two positions of the active vanes 2-*n*, for example if the active vanes 2-*n* can be controllably deployed to a plurality of open positions.

The first and second energy recovery values ERV1, ERV2 provide an indication of energy available for recovery by the exhaust energy recovery system when the active vanes 2-1, 2-2 are in the first and second positions respectively. The first and second energy expended values EEV1, EEV2 provide an indication of energy expended as a result of aerodynamic drag on the host vehicle VH1. To facilitate comparison, the first and second energy recovery values ERV1, ERV2 and the first and second energy expended values EEV1, EEV2 have the same units or are dimensionless.

The controller 25 determines the first and second energy recovery values ERV1, ERV2 in dependence on the vehicle speed signal SIN-1 and/or the temperature signal SIN-2. The first and second energy recovery values ERV1, ERV2 may be determined in dependence on the reference speed VREF of the host vehicle VH1 and the current (instantaneous) temperature of the exhaust system 6. The first and second energy recovery values ERV1, ERV2 may be modelled at least substantially in real time. Alternatively, the first and second energy recovery values ERV1, ERV2 may be pre-defined, for example in dependence on empirical data or simulation data. The first and second energy recovery values ERV1, ERV2 may be accessed from a database or a look-up table. First and second energy recovery values ERV1, ERV2 may be defined to represent the potential energy recovery when the active vanes 2-*n* are in the first and second positions respectively. It will be appreciated that the temperature of the exhaust system 6 changes with respect to time. The rate of change may be influenced by the position of the active vanes 2-*n* and/or the vehicle reference speed VREF. For example, (assuming a constant engine speed) an increase in the airflow over the exhaust system 6 (as a result of the active vanes 2-*n* being in the second position and/or a higher vehicle reference speed VREF) would be expected to result in temperature of the exhaust system 6 decreasing at a higher rate. The first energy recovery value ERV1 and/or the second energy recovery value ERV2 may be modelled with respect to time, for example to represent a reduction in the energy available for recovery as the temperature of the exhaust system 6 decreases. Other operating parameters may be used to determine the first and second energy recovery values ERV1, ERV2. For example, the first and second energy recovery values ERV1, ERV2 could be determined in dependence on a predicted engine load. The engine load could, for example, be predicted in dependence on a planned vehicle route for the host vehicle VH1. Other factors such as the ambient temperature may also be used in the determination of the first and second energy recovery values ERV1, ERV2. For example, the control system 1 can take account of prevailing traffic conditions.

The first and second energy recovery values ERV1, ERV2 may also be influenced by the flow characteristics of the air through which the host vehicle VH1 is travelling. If the host vehicle VH1 is travelling in a disturbed (turbulent) flow, the airflow through the grille apertures 14-1 and the outboard apertures 14-2 will likely be less than if the host vehicle VH1 is travelling through relatively undisturbed air. For example, the wake from a lead target vehicle VT1 may result in recirculating flow which reduces the mass flow rate through the grille apertures 14-1 and the outboard apertures 14-2 in the host vehicle VH1. The controller 25 may optionally determine the first and second energy recovery values ERV1, ERV2 in dependence on the front sensor(s) signal SIN-1 which provides an indication of the distance between host vehicle VH1 and the lead target vehicle VT1. In a variant, the controller 25 may also use the relative position of the lead host vehicle VH1 to determine the first and second energy recovery values ERV1, ERV2, for example to take account of a lateral offset of the lead host vehicle VH1 which may result in asymmetric airflow through the outboard apertures 14-2. The controller 25 may also take account of wind speed and direction in combination with the relative position of the lead host vehicle VH1 and lead target vehicle VT1.

As outlined above, the active vanes 2-*n* are operable to reduce the aerodynamic drag on the host vehicle VH1. At least under normal operating conditions, the aerodynamic drag on the host vehicle VH1 is reduced when the active vanes 2-*n* are configured in the second position. The controller 25 in the present embodiment determines the first and second energy expended values EEV1, EEV2 in dependence on the vehicle speed signal SIN-1. The aerodynamic drag on the host vehicle VH1 is influenced on the current (instantaneous) vehicle reference speed VREF. The first energy expended value EEV1 is determined for the current vehicle reference speed VREF with the active vanes 2-*n* in the first position. The second energy expended value EEV1 is determined for the current vehicle reference speed VREF with the active vanes 2-*n* in the second position. Alternatively, or in addition, the controller 25 may determine the first and second energy expended values EEV1, EEV2 in dependence on the proximity and/or position of other vehicles, for example a lead target vehicle VT1 in front of the host vehicle VH1 and/or a trailing target vehicle VT2 behind the host vehicle VH1. The first energy expended value EEV1 and/or the second energy expended value EEV2 may be modelled over a predetermined time period, for example to represent expected changes in the energy expended. The first energy expended value EEV1 and/or the second energy expended value EEV2 may be modelled with reference to a target route of the vehicle and/or prevailing traffic conditions, for example based on a predicted vehicle reference speed on the target route.

The aerodynamic drag on the host vehicle VH1 may be influenced by the flow characteristics of the air through which the host vehicle VH1 is travelling. If the host vehicle VH1 is travelling in a disturbed (turbulent) flow, the aerodynamic drag on the host vehicle VH1 may be reduced. For example, the wake from a lead target vehicle VT1 may result in recirculating flow which reduces the aerodynamic drag on the host vehicle VH1. The controller 25 is configured to determine the first and second energy expended values EEV1, EEV2 in dependence on one or more of the following: the distance between the host vehicle VH1 and the lead target vehicle VT1; the size and/or profile of the lead target vehicle VT1; the reference speed of the host vehicle VH1; and the reference speed of the lead target vehicle VT1. Other factors such as the ambient temperature may also be used in the determination of the first and second energy expended values EEV1, EEV2. The controller 25 may determine the first and second energy expended values EEV1, EEV2 with reference to a multi-dimensional array defining a plurality of these parameters. First and second energy expended values ERV1, ERV2 may be defined to represent the potential energy expenditure when the active vanes 2-*n* are in the first and second positions respectively. It has been recognised that the distance between the host vehicle VH1 and the trailing target vehicle VT2 may influence the aerodynamic drag on the host vehicle VH1. The controller 25 may determine the first and second energy expended values EEV1, EEV2 in dependence on the front sensor(s) signal SIN-3 and/or the rear sensor(s) signal SIN-4. In certain platooning conditions, the additional energy expended due to increased aerodynamic drag on the host vehicle VH1 when opening the active vanes 2-n is more than accounted for by improved energy recuperation from the waste heat recovery system 10 when the active vanes 2-n are disposed in the open position.

Figure 5:
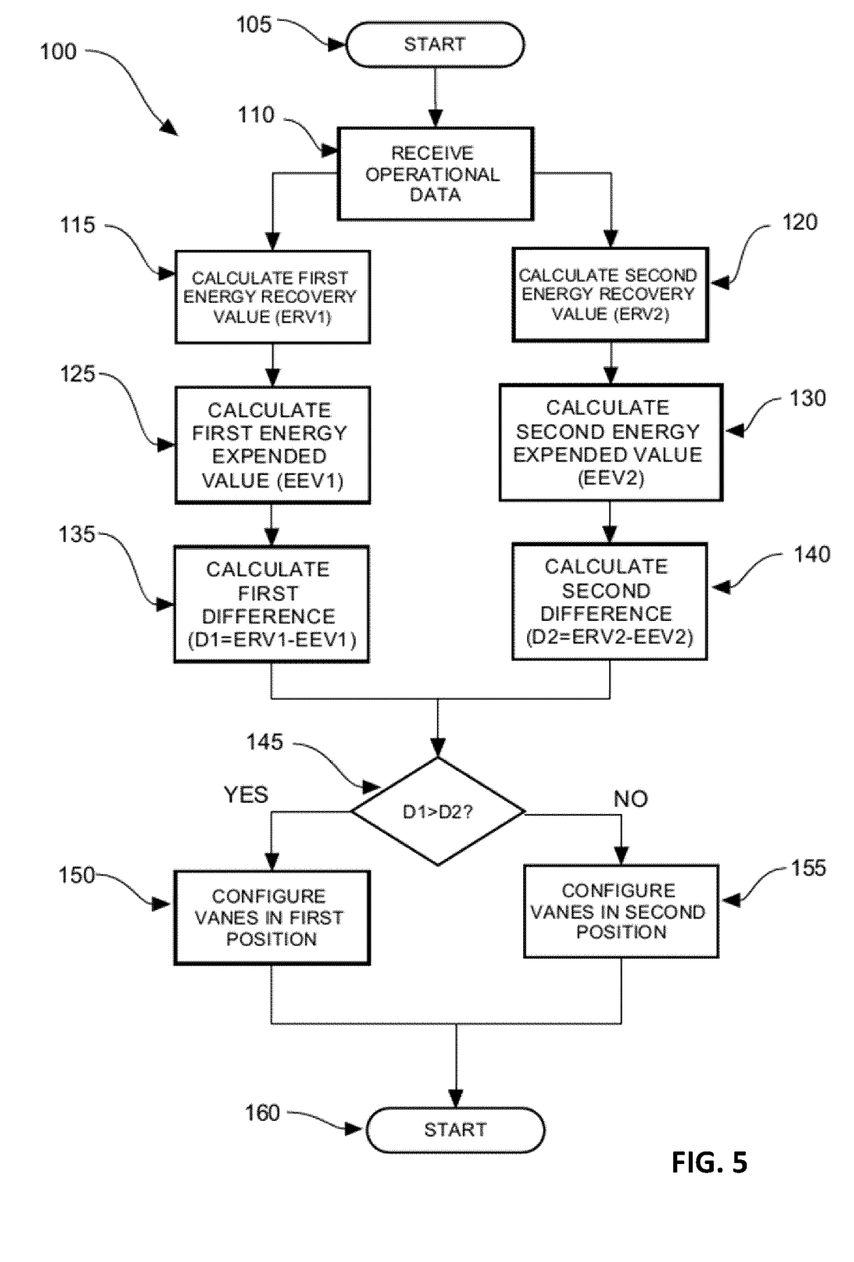
FIG. 5 shows a block diagram representing operation of the control system in accordance with an embodiment of the present invention.

The operation of the control system 1 will now be described with reference to a first block diagram 100 shown in FIG. 5. The controller 25 is activated (BLOCK 105). The controller 25 receives operational data, such as the vehicle speed signal SIN-1, the temperature signal SIN-2, the front sensor(s) signal SIN-3 and the rear sensor(s) signal SIN-4 (BLOCK 110). The controller 25 determines a first energy recovery value ERV1 representing potential energy recovery when the active vanes 2-n are in the first position (BLOCK 115); and a second energy recovery value ERV2 representing potential energy recovery when the active vanes 2-n are in the second position (BLOCK 120). The controller 25 determines a first energy expended value EEV1 representing potential energy expenditure when the active vanes 2-n are in the first position (BLOCK 125); and a second energy expenditure value EEV2 representing potential energy expenditure when the active vanes 2-n are in the second position (BLOCK 130). The controller 25 determines the first difference D1 between the first energy recovery value ERV1 and the first energy expended value EEV1 (BLOCK 135); and the second difference D2 between the second energy recovery value ERV2 and the second energy expended value EEV2 (BLOCK 140). A comparison is made of the first and second differences D1, D2 (BLOCK 145). If the comparison determines that the first difference D1 is greater than the second difference D2, the controller 25 generates an output signal SOUT-1 to configure the active vanes 2-n in the first position (BLOCK 150). If the comparison determines that the second difference D2 is greater than the first difference D1, the controller 25 generates an output signal SOUT-1 to configure the active vanes 2-n in the second position (BLOCK 155). If the first and second differences D1, D2 have the same magnitude (i.e. D1=D2), the controller 25 holds the active vanes 2-n in their current position. The controller 25 continues to control the active vanes 2-n until the host vehicle VH1 comes to a halt or it is determined that a journey is complete (BLOCK 160).

The control system 1 can determine instantaneous values of the first and second energy expended values EEV1, EEV2 and the first and second energy recovery values ERV1, ERV2. The instantaneous values can, for example, be determined in dependence on the current input signals SIN-n. The control system 1 can generate the output signal SOUT-1 in dependence on the instantaneous values. Alternatively, or in addition, the control system 1 can predict the first and second energy expended values EEV1, EEV2 and the first and second energy recovery values ERV1, ERV2, for example by modelling the values over a rolling time period. By predicting the first and second energy expended values EEV1, EEV2 and the first and second energy recovery values ERV1, ERV2, the control system 1 may pre-emptively control the active vanes 2-n, for example to pre-condition the vehicle systems. The control system 1 can generate the output signal SOUT-1 in dependence on the predicted values.

The control system 1 may be configured to control the active vanes 2-n in unison. The control system 1 can control the first active vanes 2-1 and the second active vanes 2-2 together. In this arrangement, the first active vanes 2-1 and the second active vanes 2-2 may be displaced to the first and second positions in unison. Alternatively, the control system 1 may be configured to control the active vanes 2-n independently of each other. In this arrangement, the first active vanes 2-1 and the second active vanes 2-2 may be displaced to the first and second positions independently of each other. This control strategy enables independent control of the airflow supplied for cooling through the grille apertures 14-1 and the outboard apertures 14-2.

The, or each, electronic processor 26 may comprise any suitable electronic processor (e.g., a microprocessor, a microcontroller, an ASIC, etc.) that is configured to execute electronic instructions. The, or each, electronic memory device 29 may comprise any suitable memory device and may store a variety of data, information, threshold value(s), lookup tables or other data structures, and/or instructions therein or thereon. In an embodiment, the memory device 29 has information and instructions for software, firmware, programs, algorithms, scripts, applications, etc. stored therein or thereon that may govern all or part of the methodology described herein. The processor, or each, electronic processor 26 may access the memory device 29 and execute and/or use that or those instructions and information to carry out or perform some or all of the functionality and methodology describe herein.

The at least one memory device 29 may comprise a computer-readable storage medium (e.g. a non-transitory or non-transient storage medium) that may comprise any mechanism for storing information in a form readable by a machine or electronic processors/computational devices, including, without limitation: a magnetic storage medium (e.g. floppy diskette); optical storage medium (e.g. CD-ROM); magneto optical storage medium; read only memory (ROM); random access memory (RAM); erasable programmable memory (e.g. EPROM ad EEPROM); flash memory; or electrical or other types of medium for storing such information/instructions.

Example controllers 24 have been described comprising at least one electronic processor 26 configured to execute electronic instructions stored within at least one memory device 29, which when executed causes the electronic processor(s) 25 to carry out the method as hereinbefore described. However, it is contemplated that the present invention is not limited to being implemented by way of programmable processing devices, and that at least some of, and in some embodiments all of, the functionality and or method steps of the present invention may equally be implemented by way of non-programmable hardware, such as by way of non-programmable ASIC, Boolean logic circuitry, etc.

The control system 1 has been described herein with reference to controlling first and second active vanes 2-1, 2-2 to control cooling of the heat exchanger 7 and the inverter 9. It will be understood that the techniques described herein can be used to control cooling of other vehicle systems. Alternatively, or in addition, the vehicle systems may include the one or more traction motors 5 and/or the traction battery 8.

It will be appreciated that various changes and modifications can be made to the present invention without departing from the scope of the present application.

The invention claimed is:

1. A method of controlling one or more active vanes on a host vehicle having an energy recovery system, the one or more active vanes being selectively configurable in a first position and a second position; wherein the method comprises:

in respect of one or more current operating parameters of the host vehicle, determining:
  a first energy expended value and a first energy recovery value associated with the one or more active vanes in the first position;
  a second energy expended value and a second energy recovery value associated with the one or more active vanes in the second position;
  a first difference between the first energy expended value and the first energy recovery value; and
  a second difference between the second energy expended value and the second energy recovery value, wherein the first and second energy recovery values are indicative of energy recoverable by the energy recovery system:
configuring the one or more active vanes in the first position when the magnitude of the first difference is greater than the magnitude of the second difference; and
configuring the one or more active vanes in the second position when the magnitude of the second difference is greater than the magnitude of the first difference.

2. A method as claimed in claim 1, wherein the energy recovery system is configured to recover thermal energy from an exhaust system of the host vehicle, the first and second energy recovery values being determined in dependence on one or more of the following: a temperature of the exhaust system; and a reference speed of the host vehicle.

3. A method as claimed in claim 1 comprising detecting at least one target vehicle; the first and second energy recovery values being determined in dependence on one or more of the following: a proximity to and/or a position of the at least one target vehicle; a size and/or a profile of the at least one target vehicle; and an ordinal position of the host vehicle in a platoon comprising the at least one target vehicle.

4. A method as claimed in claim 1, wherein the first and second energy expended values are indicative of energy expenditure associated with aerodynamic drag on the host vehicle, the first and second energy expended values being determined in dependence on a reference speed of the host vehicle.

5. A method as claimed in claim 1 comprising detecting at least one target vehicle; the first and second energy expended values being determined in dependence on one or more of the following: a proximity to and/or a position of the at least one target vehicle;
and a size and/or a profile of the at least one target vehicle.

6. A control system for controlling one or more active vanes on a host vehicle having an energy recovery system, the control system comprising one or more controllers, the control system configured to:
  determine a first energy expended value and a first energy recovery value associated with the one or more active vanes in the first position;
  determine a second energy expended value and a second energy recovery value associated with the one or more active vanes in the second position;
  determine a first difference between the first energy expended value and the first energy recovery value; and
  determine a second difference between the second energy expended value and the second energy recovery value, wherein the first and second energy recovery values are indicative of energy recoverable by the energy recovery system;
wherein the control system is configured to configure the one or more active vanes in the first position when the magnitude of the first difference is greater than the magnitude of the second difference; and to configure the one or more active vanes in the second position when the magnitude of the second difference is greater than the magnitude of the first difference.

7. The control system of claim 6, wherein the control system is configured to detect at least one target vehicle; the first and second energy recovery values being determined in dependence on one or more of the following: a proximity to and/or a position of the at least one target vehicle; and a size and/or a profile of the at least one target vehicle.

8. The control system as claimed in claim 6, wherein the energy recovery system is configured to recover thermal energy from an exhaust system of the host vehicle, the first and second energy recovery values being determined in dependence on one or more of the following: a temperature of the exhaust system; and a reference speed of the host vehicle.

9. The control system as claimed in claim 6, wherein the first and second energy expended values are indicative of energy expenditure associated with aerodynamic drag on the host vehicle.

10. The control system as claimed in claim 6, wherein the control system is configured to detect at least one target vehicle; the first and second energy expended values being determined in dependence on one or more of the following: a proximity to and/or a position of at least one target vehicle; a size and/or a profile of at least one target vehicle; and an ordinal position of the host vehicle in a platoon comprising the at least one target vehicle.

11. A vehicle comprising the control system of claim 6.

12. A non-transitory, computer-readable medium storing instructions thereon that, when executed, are arranged to perform the method according to claim 1.

13. A method of controlling one or more active vanes on a host vehicle having an energy recovery system, the one or more active vanes being selectively configurable in a first position and a second position; wherein the method comprises:
  detecting at least one target vehicle;
  determining a first energy expended value and a first energy recovery value associated with the one or more active vanes in the first position;
  determining a second energy expended value and a second energy recovery value associated with the one or more active vanes in the second position; and
  configuring the one or more active vanes in the first position or the second position based on the first and second energy recovery values and the first and second energy expended values,
wherein:
  the first and second energy recovery values are determined in dependence on one or more of the following: a proximity to and/or a position of the at least one target vehicle; a size and/or a profile of the at least one target vehicle; and an ordinal position of the host vehicle in a platoon comprising the at least one target vehicle; and/or
  the first and second energy expended values are determined in dependence on one or more of the following: a proximity to and/or a position of the at least one target vehicle; and a size and/or a profile of the at least one target vehicle.

14. The method of claim 13, wherein the first and second energy recovery values are determined in dependence on one or more of the following: a proximity to and/or a position of the at least one target vehicle; a size and/or a profile of the at least one target vehicle; and an ordinal position of the host vehicle in a platoon comprising the at least one target vehicle.

15. The method of claim 13, wherein the first and second energy expended values are determined in dependence on one or more of the following: a proximity to and/or a position of the at least one target vehicle; and a size and/or a profile of the at least one target vehicle.

16. The method of claim 13, wherein the first and second energy recovery values are determined in dependence on one or more of the following: a proximity to and/or a position of the at least one target vehicle; a size and/or a profile of the at least one target vehicle; and an ordinal position of the host vehicle in a platoon comprising the at least one target vehicle; and wherein the first and second energy expended values are determined in dependence on one or more of the following: a proximity to and/or a position of the at least one target vehicle; and a size and/or a profile of the at least one target vehicle.

17. The method of claim 13, further comprising:
determining a first difference between the first energy expended value and the first energy recovery value; and
determining a second difference between the second energy expended value and the second energy recovery value;
wherein the one or more active vanes are configured based on the first difference and the second difference.

18. The method of claim 17, wherein the one or more active vanes are configured in the first position when the magnitude of the first difference is greater than the magnitude of the second difference; and the one or more active vanes are configured in the second position when the magnitude of the second difference is greater than the magnitude of the first difference.

19. The method of claim 13, wherein the first and second energy recovery values are indicative of energy recoverable by the energy recovery system.

* * * * *